United States Patent [19]

Komulainen

[11] Patent Number: 4,691,751

[45] Date of Patent: Sep. 8, 1987

[54] METHOD FOR SAWING A TREE TRUNK AND FOR TREATING A UNIFORMLY THICK SLICE OF WOOD SAWED OFF THE TRUNK

[75] Inventor: Viljo S. Komulainen, Riihimäki, Finland

[73] Assignee: Aihiko Ky, Finland

[21] Appl. No.: 811,641

[22] Filed: Dec. 20, 1985

[30] Foreign Application Priority Data

Dec. 21, 1984 [FI] Finland .................................. 845090
Jan. 8, 1985 [FI] Finland .................................. 850089

[51] Int. Cl.⁴ ............................................... B27B 1/00
[52] U.S. Cl. .................................. 144/357; 144/1 R; 144/3 R; 144/378; 144/379
[58] Field of Search ............... 144/3 R, 357, 367, 376, 144/377, 378, 379, 1 R

[56] References Cited

U.S. PATENT DOCUMENTS

| | | | |
|---|---|---|---|
| 1,487,649 | 3/1924 | Foreman | 144/377 |
| 3,459,246 | 8/1969 | Ottosson | 144/356 |
| 3,513,321 | 5/1970 | Sherman | 144/357 |
| 3,736,968 | 5/1973 | Mason | 144/357 |
| 4,093,007 | 6/1978 | Hellstrom | 144/356 |

FOREIGN PATENT DOCUMENTS

536959  11/1976  U.S.S.R. .............................. 144/356

*Primary Examiner*—W. D. Bray
*Attorney, Agent, or Firm*—McGlew and Tuttle

[57] ABSTRACT

The present invention relates to a method for sawing a tree trunk and for treating a slice of wood of uniform thickness sawn off the trunk. In the first method, the trunk dimensions and shape as well as the biological quality of each section of the trunk both in the lengthwise and the crosswise direction are defined along with the sawing process, and this information is taken into account while treating the trunk. This method is characterized in that the production programme, which comprises various articles, i.e. product components, of different measures and qualities, is recorded (a) before the actual sawing process. The trunk is sawn into two halves in the middle (b), or the heart slice is removed therefrom (i). The longitudinal quality borders of each trunk half are defined on the basis of the sawn face and recorded (c), and further the shape and size of the trunk half are measured and recorded (d). The quality information and the measuring results are combined (e). The cross-cutting lines and the sawing patterns of the trunk halves are optimized on the basis of the measuring results and the quality information so that each trunk half is divided, in the lengthwise direction, into sections, each section in principle belonging to the same quality grade, and that into each section there are fitted suitable product components from the production programme and the value yield is maximized (f), whereafter the trunk halves are cross-cut and slices of desired sized are sawn off the halves, which slices are further sawn into suitable product components (g) and sorted out (l).

10 Claims, 9 Drawing Figures

METHOD FOR SAWING A TREE TRUNK AND FOR TREATING A UNIFORMLY THICK SLICE OF WOOD SAWED OFF THE TRUNK

BACKGROUND OF THE INVENTION

The present invention relates to a method for sawing a tree trunk, in which method, along with the sawing process, there are defined the trunk dimensions and shape, as well as the biological quality of each section of the trunk, both in the longitudinal and the transversal direction, and wherein these characteristics are taken into account while treating the trunk.

The invention also relates to a method for treating a uniformly thick slice of wood sawed off the trunk, wherein the shape of the slice of wood and its quality are defined, whereafter the slice is cut and sawed according to the said definitions.

With respect to quality, a tree trunk is divided into three sections in the lengthwise direction. The butt end is a knot-free section, because the branches have pruned naturally at an early stage, and consequently the butt end is valuable wood material as a whole. The following section contains dead knots, part of which remain inside the trunk and part of which extend to the trunk surface. The third section is full of sound knots up to the top end of the trunk. When a log is sawed into lumber, it is important that the individual articles are of a homogeneous quality, i.e. that they are sawed off the same quality section. The value, or the quality, of sawed goods is determined with respect to the quality defects contained therein. If the beginning of a sawed product is knot-free but the rest contains dead, rotten knots, the quality of the whole article is determined according to the latter. If the length of the knot-free section is over 1.8 m, the knotty part can be cut off. The quality is improved, but the quantity is decreased.

The term 'sawed goods' generally refers to such wood material which is produced by means of sawing or in a similar manner of tree trunks, i.e. logs, and processed into articles with certain standard dimensions (thickness×width×length) which are pre-dried and sorted out according to certain quality grades (for instance unsorted, fifth-grade and sixth-grade).

According to the use of the final product, sawed goods of different qualities often have different dimensions. In order to improve the process of sawed goods, logs containing different wood materials should therefore be sawed into several different thicknesses and widths, and in some cases also into different lengths. While in the currently used method of sawing the thickness of sawed goods, as well as the width of the center-part product are defined already when the blade settings are made, i.e. beforehand, the practice is to try and assess the quality of the logs already at the cutting site in the wood, as well as at the saw mill in connection to the sorting of the logs. The quality assessment is carried out on the basis of the visible knot border on the outer surface of the log, or on the basis of knot bumps. Part of the knots, however, are inside the trunk, and therefore it is impossible to accurately define any exact quality sections. In order to find out the quality borders, for instance X-ray devices have been tried, but they have not fulfilled the expectations, and they cannot be used at the cutting site in the wood.

Better information of the quality is received in the so-called double cutting, where in the first breakdown the two opposite sides of a log are sawed into boards, whereafter in the second breakdown the center part, i.e. the cant, is turned on its flat side and sawed into several pieces either by means of a frame saw, a multiple-blade circular saw or by several band saws. The sawn faces of the cant tell a lot more about the quality of the log than the round log as such. Logs of different qualities can now be sawn with different blade settings, if the saw mill has been planned so that various different thicknesses can be sawn either by means of parallel sawing machines or such equipment where the blade settings can be quickly adjusted. This arrangement, however, increases the expenses because of extra machinery, and causes problems with accuracy when several blades must be set simultaneously. The time needed for setting lowers the capacity, because the intervals between logs are lengthened. In both methods, the number of possible setting alternatives is fairly limited. Moreover, the sawing thickness of the first side cuts must be estimated on the basis of the log surface. In the so-called travelling carriage sawing method, a log can be sliced into desired thicknesses starting from the outer surface and proceeding towards the heart, so that the first-sawed face gives a hint of the quality of the following piece, and the thickness of the following piece can still be determined at this stage. But in this method, too, the deliberately or naturally pruned knot section comes as a surprise.

Among the greatest drawbacks in the current methods of sawing tree trunks is the fact that the trunks are cut into logs before the actual sawing stage. Although an erroneous cutting were registered as the sawing proceeds, the damage is already done and cannot be corrected; the only possibility is to try and minimize the created damage by special operations. In some sawing methods it is possible to crosscut a piece sawn off the log, for instance a side cut component, and to keep the resulting pieces for further processing. The already performed stages of treatment, such as cutting into logs and sawing, limit the alternative choices in further processing. In the case of the above example, the thickness and short total length create a limit, in which case the achieved benefit remains small and often unprofitable. Therefore this alternative has in practice disappeared from the sawmill industry.

Ordinary lumber is delivered from a sawmill for further processing, for instance in furniture industry. In industrial processing, the sawed goods are treated in the following ways: they are dried, split, trimmed and sorted, and the received product components are grouped into suitable component bundles according to the specific needs of the production, whereafter the final products or their various parts are manufactured of the said product components and finished for example by means of planing, grinding and surface finishing.

When industrial processing makes sawed goods into various wood products, the resulting proportion of wasted raw material rises high. The amount of trimming and quality waste may rise up to 15–30 %, sometimes even higher. Naturally this is a considerable factor in the total expenses. At the same time it is a factor of great uncertainty in the production, because the final amount of faltless material received from the purchased sawed goods may vary remarkably.

The reason for the creation of trimming waste is that the length of the sawn goods is unsuitable with respect to the length of the final product. Generally sawed goods are sold in lengths as-sawed, in which case some lengths may be suitable and others remarkably oversized, resulting in lengthy rejects. Another reason for trimming waste is that the goods contain defects which are not acceptable in the final product. Consequently they must be removed at the trimming stage. These defects cause cutting waste also when it is possible to buy cut-to-size sawed goods which are exactly suitable as regards the length of the final product. In addition to the waste created while trimming off defects, other reject pieces are created at the same time.

Apart from the elimination of single defects, quality waste is also created because part of the sawn goods does not correspond to the quality required by the final product in question. In practice sawed goods are graded according to the general grading standards for export lumber, i.e. into unsorted, fifth-grade, sixth-grade and schaalboard, and this classification rarely matches the quality requirements set for the final product. Therefore whole articles of sawed goods must sometimes be rejected, and while trimming, part of the article must be removed for secondary use.

The amount of created waste can be decreased if the manufacturer can use raw material with the same original dimensions but with several different qualities and lengths. The reject pieces can also be joined or glued together, if there is demand for such secondary sawed goods. This, however, leads to extra work and expense. Generally different qualities also have different dimensional requirements.

In the most difficult situation are such further processors of sawed goods need only one specific length of a raw material with a homogeneous quality. Finnished sawed goods can only be processed into such raw material with a high proportion of waste. Therefore many manufacturers have started to use African wood species which are uniform in quality—irrespective of their high price.

OBJECT AND SUMMARY OF THE INVENTION

The object of the tree trunk sawing method according to the present invention is to eliminate the above mentioned drawbacks and to achieve an accurate definition of the quality section in the trunk, both in the lengthwise and the crosswise direction, so that the homogeneous part of the log can be sawed into the specific thickness and length of the product component which best corresponds to the quality and length of the final product. At the same time the trunk value yield can be raised up to a completely new level compared to the present bulk production. In order to realized this, the tree trunk sawing methods of the invention is characterized by the novel features presented in the appended patent claims 1-4.

In order to eliminate the said drawbacks connected to the treatment of sawed goods, the object of the method for treating a uniformly thick slice of wood according to the invention also is to change the process so that the product components are produced already at the saw mill, in connection with the sawing. Consequently, the wood slices sawed off the log are not processed into conventional sawed goods, but directly into product components ordered by the industrial end user, which components have exactly the right length, dimensions (width and thickness) and quality. At the same time different sections of wood material can be better utilized in the right product according to quality, and the value yield of the log or the slice can be increased. The method for treating a uniformly thick slice of wood according to the invention is mainly characterized by the novel features presented in the appended patent claims 5-8.

Several advantages are achieved by employing the tree trunk sawing method of the present invention. The need for trimming and optimizing at the cutting site is decreased. The normal sorting of logs becomes unnecessary. While the log halves are measured in order to define the points for cutting and the position for the blades, the log proceeds on its sawed face, so that the feeding becomes secure and the measurements more accurate than before. Moreover, the quality limits are also known at the measuring stage, so that the sawing of special thicknesses can be limited to the required quality only. The number of sawing blades is small, and all thicknesses can, if desired, be sawn without changing the position of the blades. Furthermore, the quality of the sawed face on the remaining log half can be reexamined after each sawing operation, and further treatment can be arranged on the basis of this. When the sawing direction is from inside the trunk towards the outer surface, the quality factors are observed earlier and more accurately, and their effect in depth can be anticipated. The method allows for a separate quality assessment for each stand marked for cutting, and this could be used even as a basis for a new quality-based system of payment.

The principal advantage of the method for treating a uniformly thick slice of wood according to the invention is very likely the fact that it raises the degree of processing in any employed sawing process. Instead of producing raw material, the products are semi-manufactured articles, the prices whereof are remarkably higher than those of ordinary sawed goods. Moreover, the various section with different qualities contained in a trunk or a log, as well as the conical shape of the trunk, can be utilized considerably better than before. Because the nature of the final product is defined already before drying, the sorted-out groups of products can be dried into the correct dampness all at the same time and already at the sawmill.

In both of the methods of the present invention, the aim in short is to produce, already at the sawmill, such product components which are directly suitable for further processing. In the first method, i.e. the tree trunk sawing method, the raw material for the product components is a while tree trunk. The sawing process of each trunk is planned on the basis of the product component orders stored in the memory of a processing computer or equivalent. In the second method, i.e. the method for treating a slice of wood, the raw material for the product components is a wood slice of a uniform thickness sawed off the trunk, but separate slices can still have difference thicknesses. The wood slices can be sawed off the trunk either by using some prior art method or by employing the first sawing method according to the present invention.

In the following the method for sawing a tree trunk according to the invention and the method for treating a slice of wood are explained in more detail with reference to the appended drawings, where FIG. 1 is an illustration of the quality sections in a trunk split into two;

Figure 1:
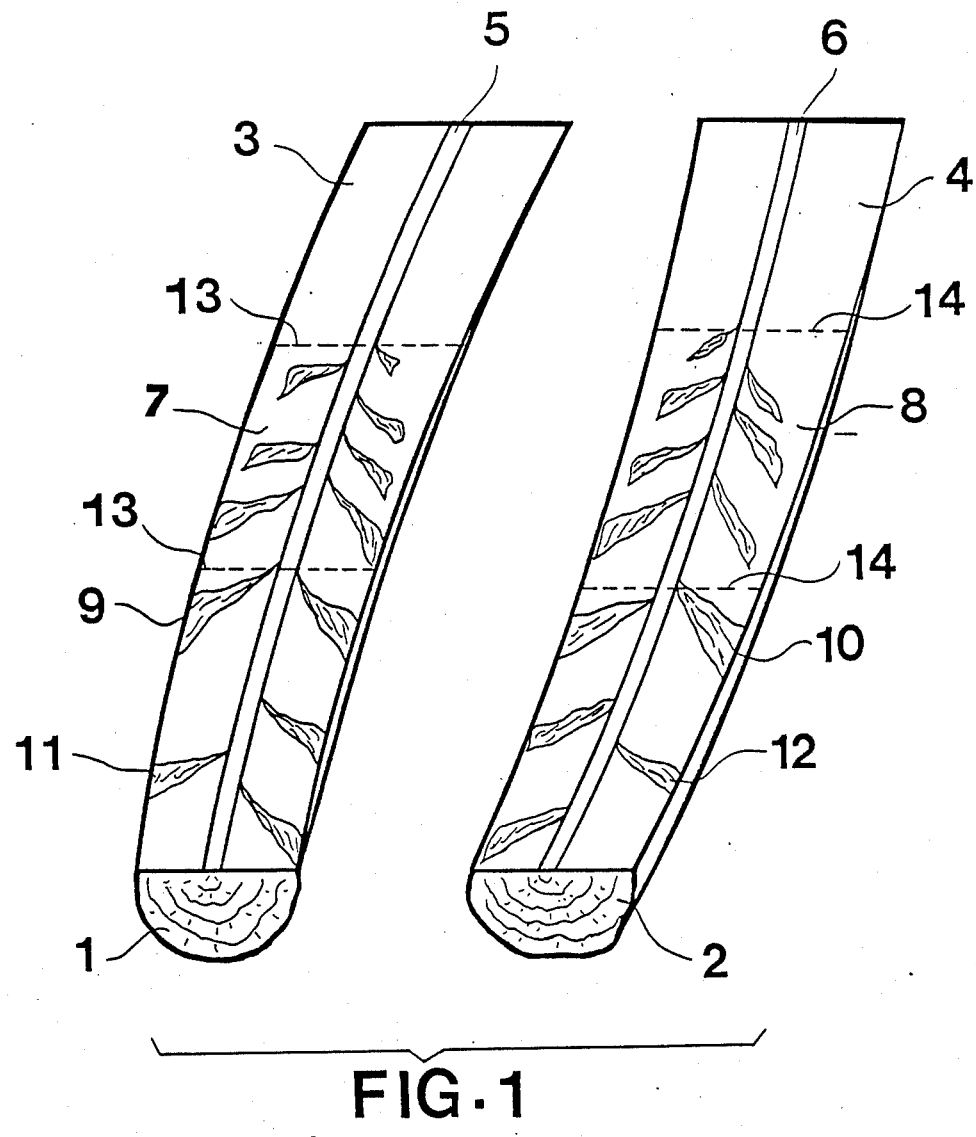

FIG. 1 illustrates a redwood trunk split into two, and the quality sections in the two halves 1, 2. The knotless sections 3, 4 of the butt end are formed around the heart 5, 6 which is poor in knots, and they continue along the surface towards the section 7, 8 containing dead knots. Large lower branches have grown in the sections 9, 10 with sound knots, and the branches have become smaller towards the top end 11, 12. A whitewood trunk is mainly full of sound knots. Particularly the knotless area is remarkably shorter than in whitewood. The dotted lines 13 and 14 stand for the considered quality limits.

Figure 2:
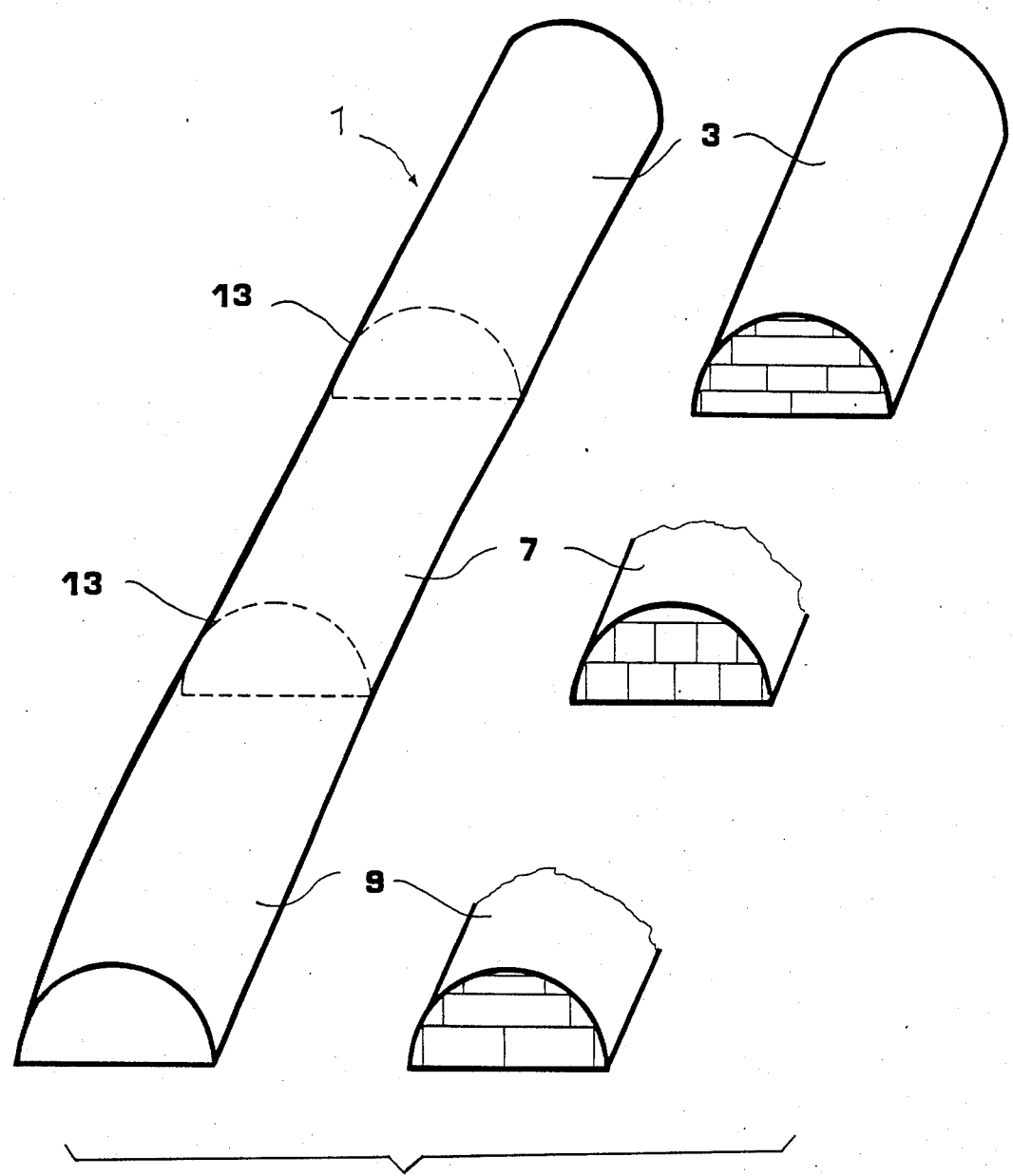
FIG. 2 is an illustration of various alternatives for sawing the different sections of the trunk.

FIG. 2 illustrates the possible alternative for sawing the different quality sections of the trunk halves, which alternatives are optimized by means of a computer on the basis of the quality, shape and length of the halves, as well as on the basis of the required product components. After each sawing operation and on the basis of the new information received thereby, the computer can revise its original plan and change it in order to improve the value yield.

Figure 3:
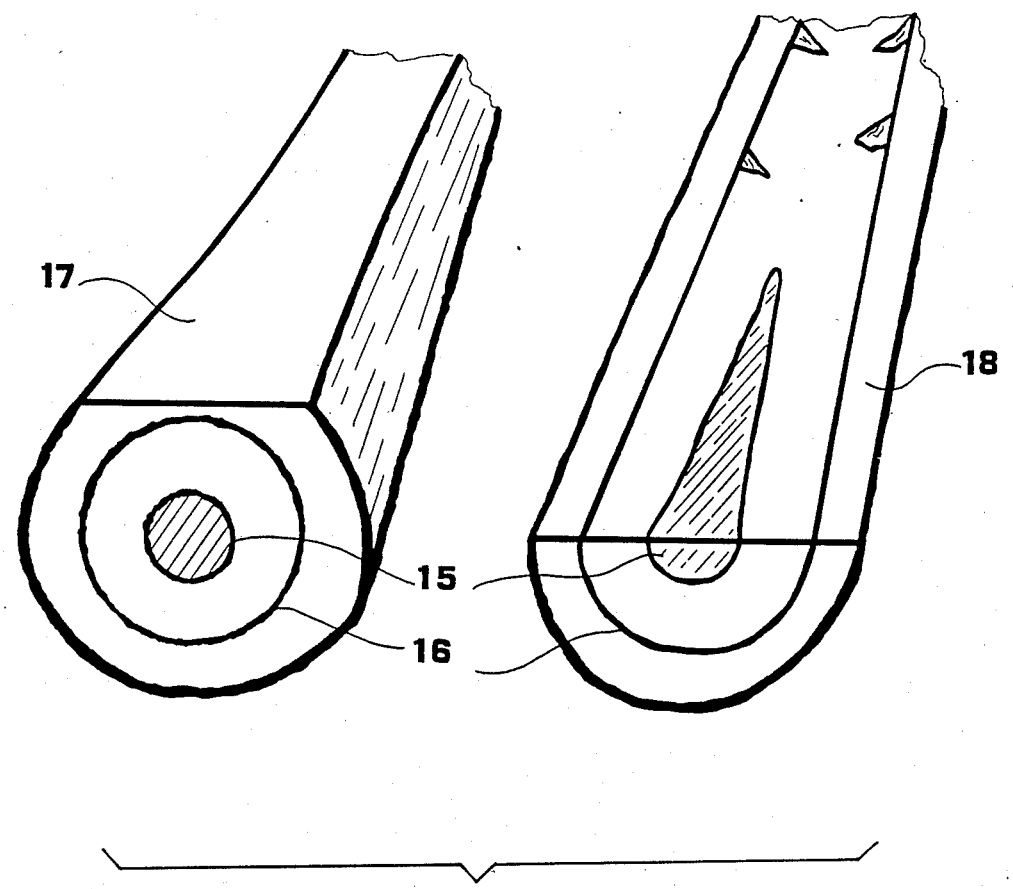
FIG. 3 illustrates the visibility of the quality sections in different sawing methods.

FIG. 3 shows how easy it is to register various quality defects when the sawing method of the invention is employed. If the sawing proceeds from the surface towards the heart, the sawed face 17 does not reveal for instance the heart rot 15 or the pruning section 16, but the next sawing depth must be chosen by guesswork. If the trunk is split into two, however, both of the defects can be seen immediately on the split face 18, and the depth of the said defect can also be estimated on the basis of the observation.

Figure 4:
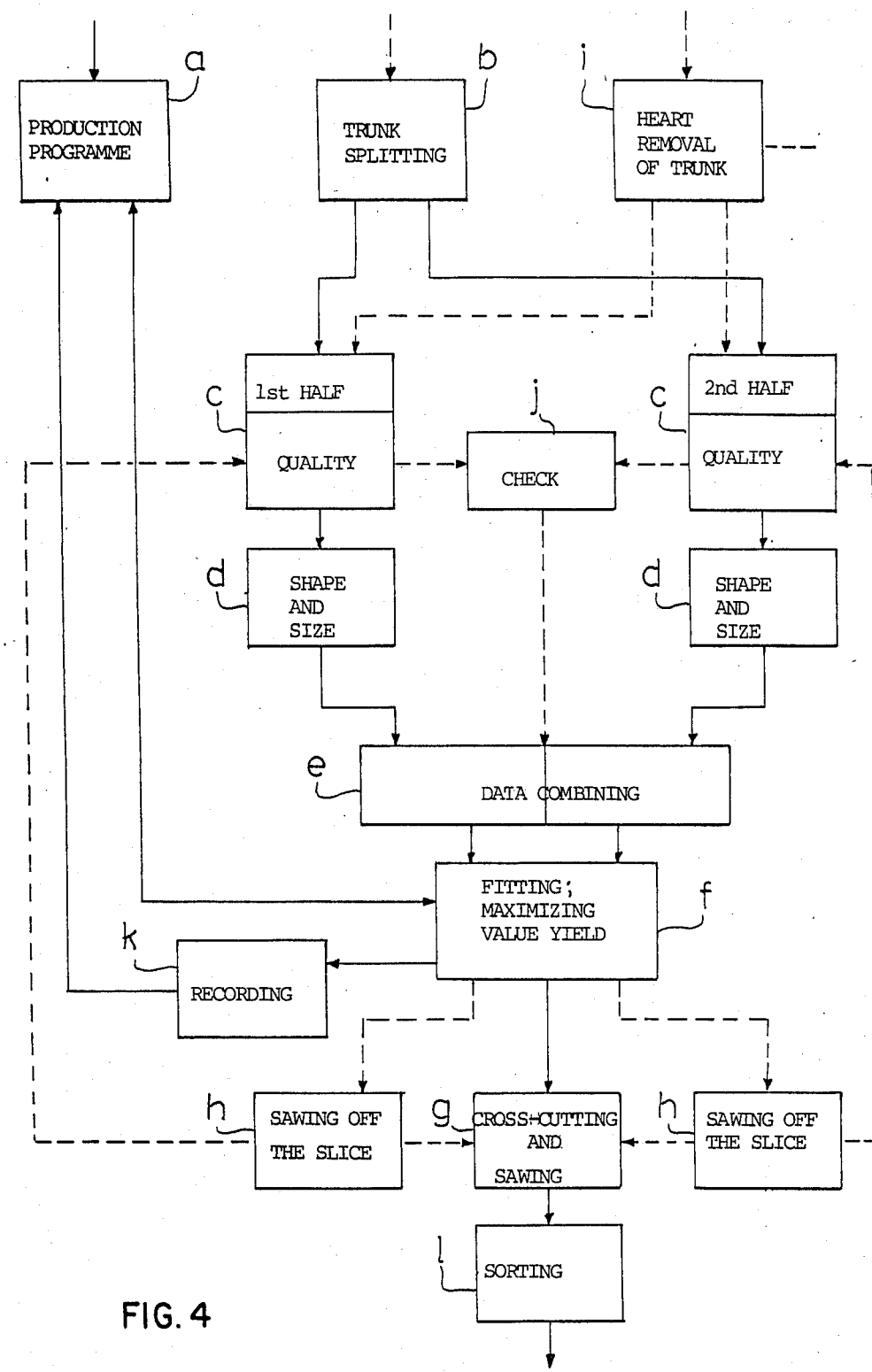
FIG. 4 illustrates the tree trunk sawing method of the invention in block diagram.

FIG. 4 illustrates the tree trunk sawing methods of the invention in the form of a block diagram. The production programme or schedule of goods needed comprising articles, i.e. product components, of various dimenions and qualities, is advantageously stored before the actual sawing into the memory of a processing computer or equivalent, block a. The trunk is preferably sawed in the middle into two halves, block b. The lengthwise quality borders 13, 14 of each trunk half 1, 2 are defined on the basis of the sawn face 18 (FIG. 1 and 3) and stored in the memory, block c. The shape and size of the trunk half 1, 2 is measured and stored into the memory, block d. The measuring results from block d are combined with the quality information defined in block c, block e. The cross-cutting points and sawing patterns are optimized on the basis of the measuring results and quality information so that each trunk half is lengthwise divided into sections 3, 4; 7, 8; 9, 10 (FIG. 1), which sections in priciple belong to the same quality grade each; each section is then fitted with such product components from the production programme which belong to the respective quality grade (FIG. 2) and the value yield is maximized, block f. Thereafter the block halves are sawn off and cross-cut into suitable product components, block g, and sorted out, block 1. The realized product components are registered and removed from the product component programme to be sawed, block k. Only one slice at a time can be sawed off either one of the trunk halves, block h, and the remaining part of the trunk half is circulated in the above described sawing process until both of the trunk halves are fully treated. If necessary, a thin slice, advantageously corresponding to the thickness of the heart, for instance 50 mm, can be sawed off the center of the trunk, block i, whereafter the trunk halves obtained on both sides of the said slice are treated in the above described manner. The sawed faces 18 (FIG. 1) of both the first-sawed trunk halves can be simultaneously utilized in order to support each other's grading, block j.

The term 'product component programme' refers to the set of product components which are ordered from the sawmill and are presently being produced; in this programme the dimensions and quality of each product component is defined, and their prices are also included in the programme. Thus the generel stock of orders for the product components is larger than the set of product components chosen for production according to certain criteria. Value-optimization or the maximization of the value yield means that among the possible sets of product components, there is chosen the set which is econimically or moneywise the most profitable and which can be sawed off the tree trunk or part thereof when the prevailing product component programme is taken into account.

Figure 5:
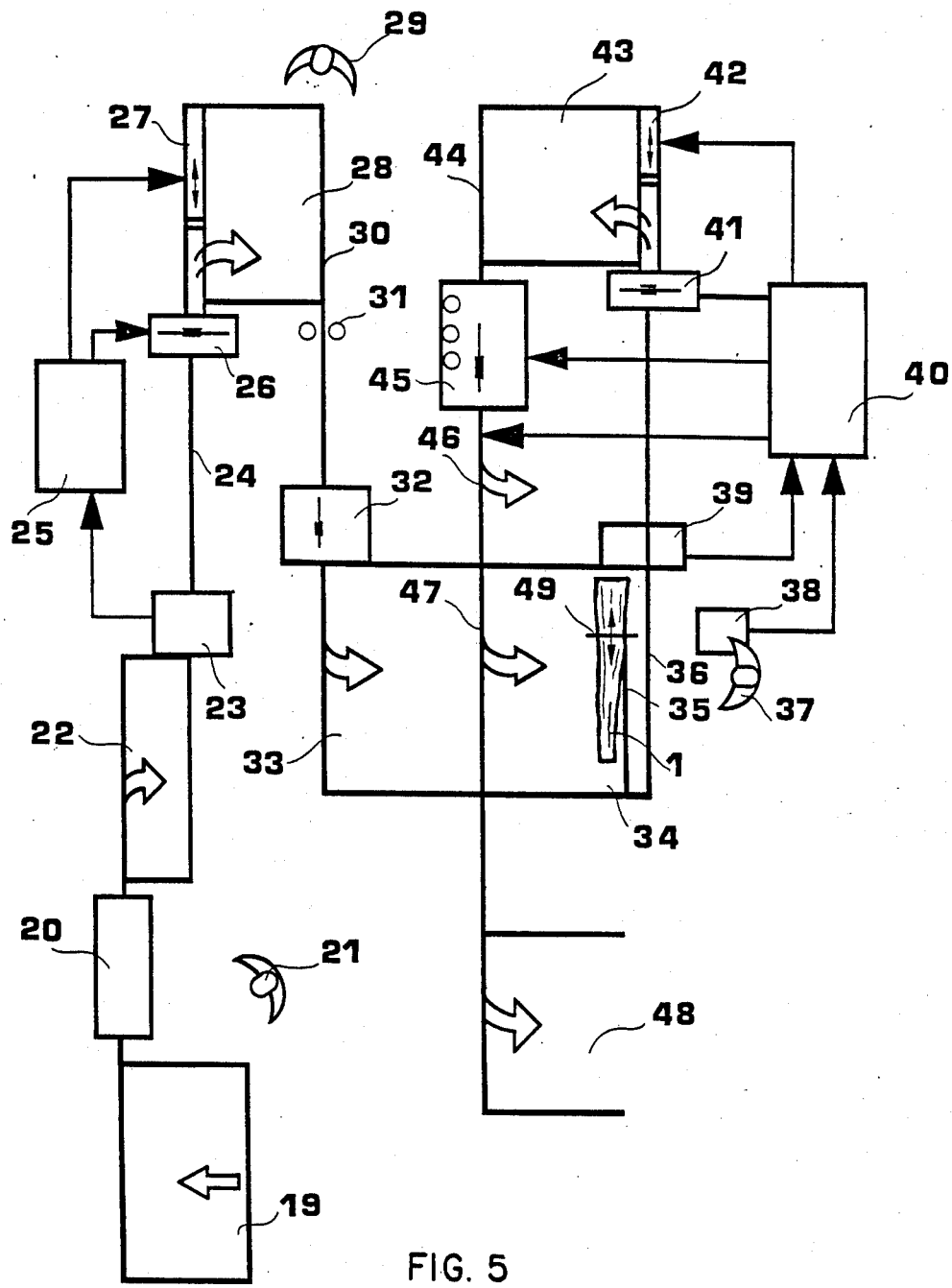
FIG. 5 illustrates a sawing line where the tree trunk sawing method of the invention is applied.

FIG. 5 illustrates a sawing line where a preferred embodiment of the invention is applied. Here the trunks are tansported to the sawmill being as long as it is possible with respect to transporting techniques. If the trunk is crooked or twisted into two or more directions, or if it is curved or contains other apparent defects, it must be cut into shorter sections so that each section can be sawn basically in a symmetrical position with respect to the sawing line. This cutting can be carried out already in the wood at the cutting site, but preferably it is carried out at the sawmill according to the following example.

The trunks are fed onto the transversal conveyor 19, wherefrom they are, under the supervision of the operator 21, fed one by one into the barking machine 20. Thereafter the trunk proceeds through the intermediate storage 22 onto the measuring line 24. The shape and length of the trunk are measured by means of the log scanner 23, and the information is fed into the computer 25, which checks the need for cutting and estimates the possible cutting points. The computer 25 also controls the servo setting unit 27 and the cross-cut saw 26, which is used for cutting the trunk when necessary. Thereafter the trunk or part of it is conveyed through the intermediate storage 28 onto the feeding line 30, where it is turned into a symmetrical position with respect to the feeding line, so that the crooked part points up or down, in which position it is further fed through the sawing unit 32. The turning operation is carried out by means of the turner unit 31 controlled by the operator 29.

After splitting the trunk into two, the trunk halves are conveyed in succession through the intermediate storage 33 into the grading stand 34, where the grader 37 observes the quality sections of the trunk half 1 on the basis of the sawed face. The grading becomes even more reliable if both halves of the trunk, as in FIG. 1, are seen at the same time. By means of the press keys located in the control board 38, the grader can scan a moving laser line 49 or equivalent lengthwise across the trunk. According to his estimation, he directs the line to the quality border, taking into account the various quality factors both in the lengthwise and the crosswise direction. After placing the line at the desired point, the grader informs the computer 40 by using the press keys and reports for example the quality grade of the section remaining on the right-hand side of the line. Thereafter the line is shifted to the next quality border, and the new quality grade is similarly reported. This procedure is continued until the whole log is graded. In connection to the press key information about the quality grades, the computer also reads the positions of the laser line, and thus the visual information of the quality is stored in its memory. Grading can be carried out for both of the log halves simultaneously, or for each half individually.

After grading the half-log is turned, by means of the turning unit 35, on its sawed face and fed into the measuring line 36. The profile scanner 39 measures the shape and size of the corss-sections of the half at given intervals, for instance after each 2 cm, and the readings are fed into the computer 40, which combines this information with the information about the quality. On the basis of this information, and by means of an input production programme, the computer optimizes the cutting points and the sawing patterns as in FIG. 2, and controls the further processing of the material.

After measurements the trunk half is cut, by means of the moving servo setting unit 42 and the cross-cut saw 41 into desired pieces, which are one by one conveyed through the intermediate storage 43 onto the resaw one 44. By aid of a blade or a roller assembly installed in the saw 45, a slice of a desired thickness is sawed off the trunk half, and this slice is directed into further processing 48, to be sawn into suitable widths for example by using a multiple-blade saw, or to be further processed according to the slice treatment method explained in more detailed below. The rest of the trunk half is returned to circulation at the point 47, or, if it is fully exploited, it can be dropped into chipping at the point 46. Thus after each sawing operation the sawed face can be checked and the required correcting measures can be taken. Naturally the final sawing plan can be carried out already after one grading and measuring, but the result is less certain. The arrows in FIG. 4 illustrate the direction in which the sawing process proceeds. Each part of the trunk is treated in a similar fashion. Consequently the received product components are as homogeneous in quality as possible—either knot-free of containing dead or sound knots—and preferably as near as possible to the required dimensions of the final product. Thus the trimming and quality waste for the enterprise manufacturing the final product are of a decisively lower degree than with ordinary sawed goods. At the same time each part of the trunk is used for a purpose best suited for it without wasting valuable wood material in purposes where wood material of a lower quality serves as well.

The above described method for sawing a tree trunk according to the present invention is practicable also in cases where the part containing the heart of the trunk must be removed. In that case the heart piece, the thickness whereof is for example 50 mm, is first sawed off separately, and the remaining trunk halves are treated according to the invention as is described above. The scope of the invention is naturally not limited to the above described examples only, but includes all such methods were the sawing process is started, unlike in the prior art methods, at the heart of the log and proceeds gradually towards the surface, and where the quality of the sawn face determines the cutting point of the trunk half or of the slice, as well as the successive sawing thickness. Another essential feature of the method is the fact that the possibilities for further processing are limited as little as possible at the stage when the quality factors of the trunk are seen on the sawn face.

Figure 6:
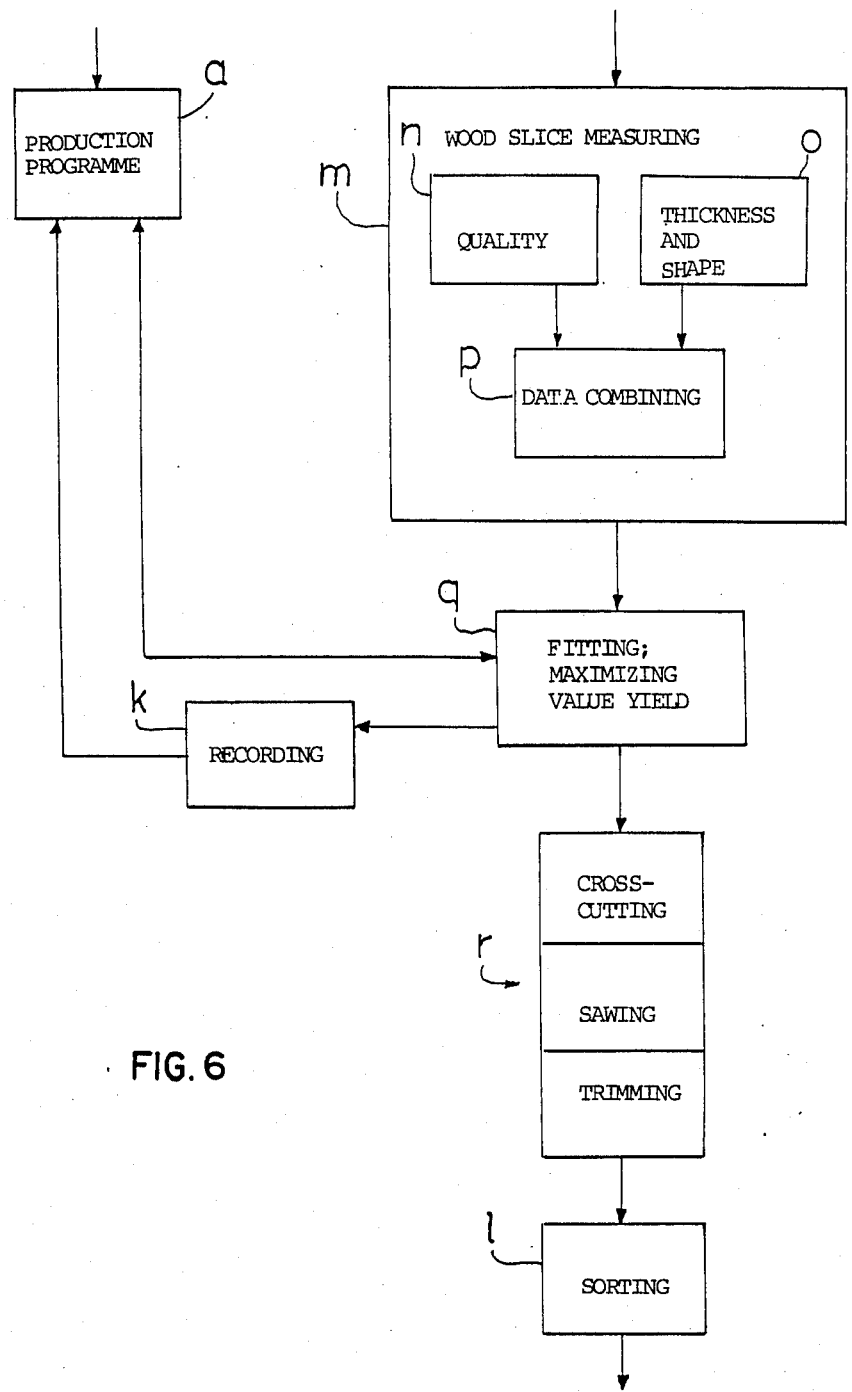
FIG. 6 illustrates the wood slice treatment method of the invention in block diagram.

FIG. 6 illustrates the method of the invention for treating a uniformly thick slice of wood sawn off a trunk. The production programme which comprises articles, i.e. product components, of various dimensions and qualities, is advantageously recorded before the actual sawing into the memory of a processing computer or equivalent, block a. The wood slice is fed into the sawing process, at the first stage whereof it is measured, block, m. The lengthwise quality borders of the wood slice are defined and recorded, block n. The thickness and shape of the wood slice is measured and recorded, block o. The quality information and the measuring results are combined, block p. The cross-cutting points and the sawing patterns are optimized on the basis of the measuring results and quality information so that in the wood slice there are fitted such product components that are included in the production programme, and from among the possible combinations of product components there is chosen a combination where the value yield from the wood slice is maximized, block q. Thereafter the wood slice is cross-cut and sawed into desired product components, block r. The realized product components are registered or recorded and removed from the production programme to be sawed, block k. The read-made product components are sorted out, block 1, according to the given sorting instructions which are recorded in the computer memory. The cross-cutting, sawing into components and finishing into product components of the wood slice, as well as the sorting of the components, are preferably arranged so that they are carried out automatically on the basis of one measurement of the wood slice in question, block m, on the basis of the predetermined production programme, block a, and on the basis of the given sorting instructions, block 1.

The original material in the method for treating a wood slice, according to the present invention, is formed of uniform, thick slices, of varying thicknesses sawed off a log but the width of which slices change according to the shape of the trunk in question. The more central part of the trunk the slice represents, the wider it is. The butt end is naturally wider than the top end.

According to the biological structure of wood, its quality varies in the different parts of the trunk as has been described above. In order to achieve a product component with a homogeneous quality, the component must be sawed off at that section of the slice which best corresponds to the respective quality requirements. The valuable, knot-free part must naturally be used only for products where the best quality is required.

The above cited value optimization per each slice can, according to the present invention, be carried out for instance by manually marking the different defects with recognizable marks for example with paint. Thereafter the slice is run through a device which measures the shape of the slice, observes its thickness and the quality of its separate sections by aid of the defect marks. In the computer memeory there is recorded a sales programme or a production programme which comprises various articles, i.e. product components, with different dimensions and qualities. The computer now makes the best possible plan for sawing each individual slice of wood. The aim of the sawing plan is to eliminate defects and to achieve a value yield as great as possible, as well as to ensure the homogeneous quality of each component. Therefore the information about the prices of the components, which information is stored in the computer memory, can be obtained directly while confirming the order from a sawmill.

According to the optimized sawing plan made by the computer, a slice can be cross-cut at a predetermined point, so that the first end of the slice can be sawed into components with a different width than in the other end. Thus for instance a butt swelling can be made use of, and the quality of the different wood materials contained in the separate sections of the slice can be taken into accoumt. Naturally the slice can, according to the invention, be cross-cut at more than one point, if the sales programme includes only short articles, which are most advantageously sawed off the shorter sections of the slice.

The following stage is the sawing of a slice or of its cross-cut pieces into bars with a width according to the production programme. The sawing may take place in the lenthwise direction of the slice, one sawing operation at a time. The first operation cuts off the uneven edge of the slice, which edge conforms to the shape of the original trunk. Thereafter the trimmed edge is driven against the computer-controlled settings, and the width of the bar to be sawed off is defined. The number of successive sawing operations depends on the computer-made plan for each individual slice.

Thereafter the bars sawed off the slices are trimmed to their final length. In connection with the trimming there is carried out the elimination of defects such as oversized knots, rotten knots, bark pockets etc., which are not accepted in any class of product components, or which lower the practical quality of the particular component. At this stage each bar is cut, according to the computer-made plan, into such components that their quality requirements are best suited for the quality of the wood material of the bar. In order to successively carry out the quality-based cross-cutting operation, the production programme must contain product components with several different qualities and lengths.

The last stage is the sorting out of the components with different lengths, widths and qualities, into respective staples and their preparing for delivery or drying.

Figure 7:
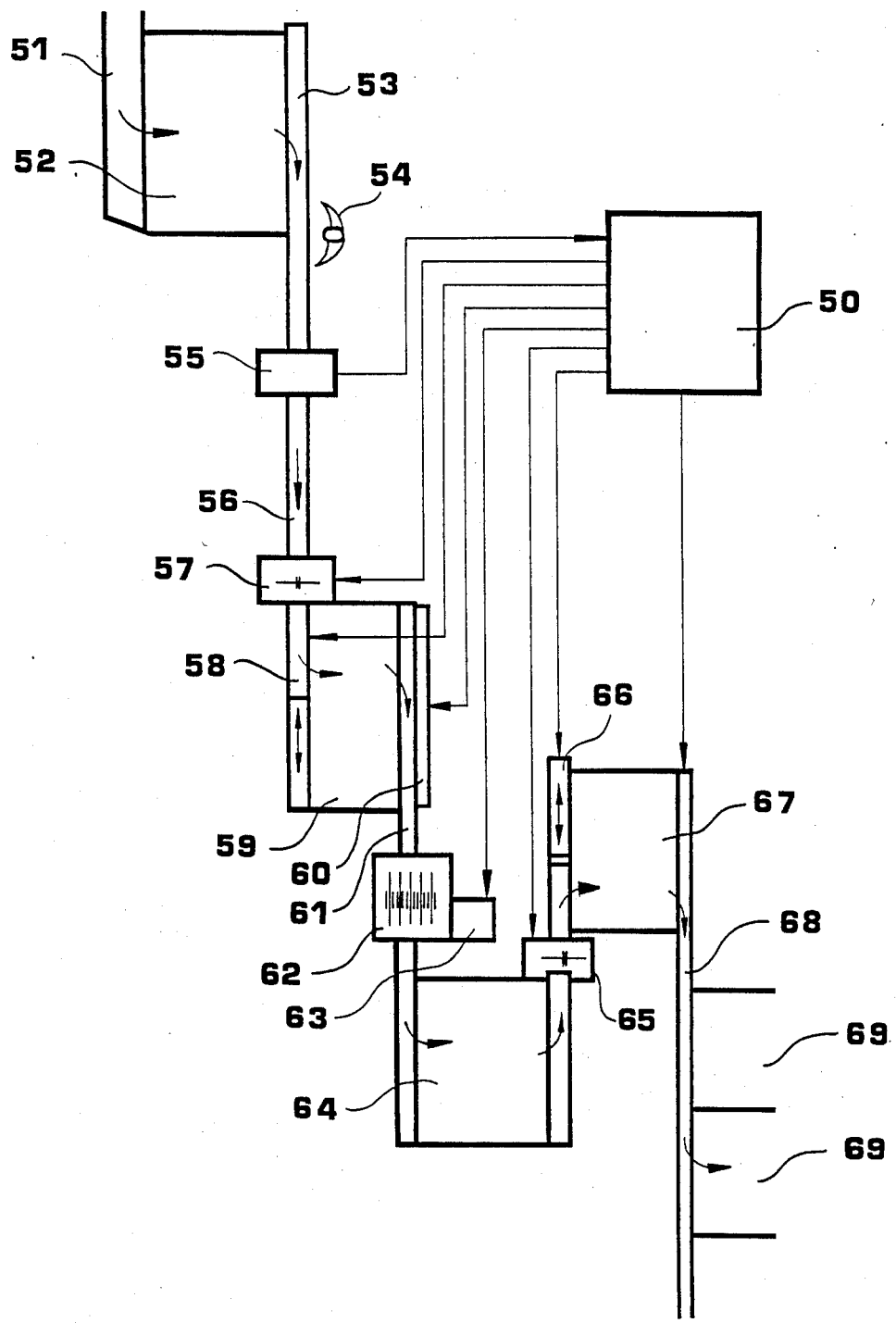
FIG. 7 is a diagrammatic illustration of a preferred embodiment of the wood slice treatment method according to the invention.

The method for treating a slice of wood according to the invention can be realized as is illustrated in FIG. 7. The sawn-off slice of wood is transported from the sawing line 51 onto the transversal conveyor 52, wherefrom it is fed onto the grading line 53. The grader 54 marks such quality defects which are difficult to measure with specific marks, whereafter the slice is shifted through the scanner 55. The results from the shape and quality measurements are fed into the computer 50, which makes an optimal plan for sawing the slice into product components on the basis of the said measuring results, the production programme stored in its memory and the initial information. Thereafter the slice is fed along cross cutting line 56 and directed against the servo setting unit 58 of the cross-cutting saw 57, and the cross-cutting operations according to the sawing plan are carried out under the supervision of the computer.

According to FIG. 7, the slice or the cross-cut part thereof is conveyed, after the cross-cutting saw 57, through the intermediate storage 59 against the orientation member 60. By aid of this member and the computer 50, the piece is directed, in a chosen position, through the input line 61 into the multiple-blade saw 62. The blades of the saw can be adjusted by means of the setting device 63. By aid of the computer 50, the blades are adjusted, at the intervals between feeding in the pieces to be sawed, so that the position of the blades corresponds to the next sawing programme. After sawing, the sawed-off components are kept apart and fed one by one through the buffer storage 64 onto the trimming line, where the final trimming of the component is carried out by means of the computer 50, the cross-cut saw 65 and the servo setting unit 66, in a similar fashion as with the saw 57 and the setting unit 58.

Figure 8:
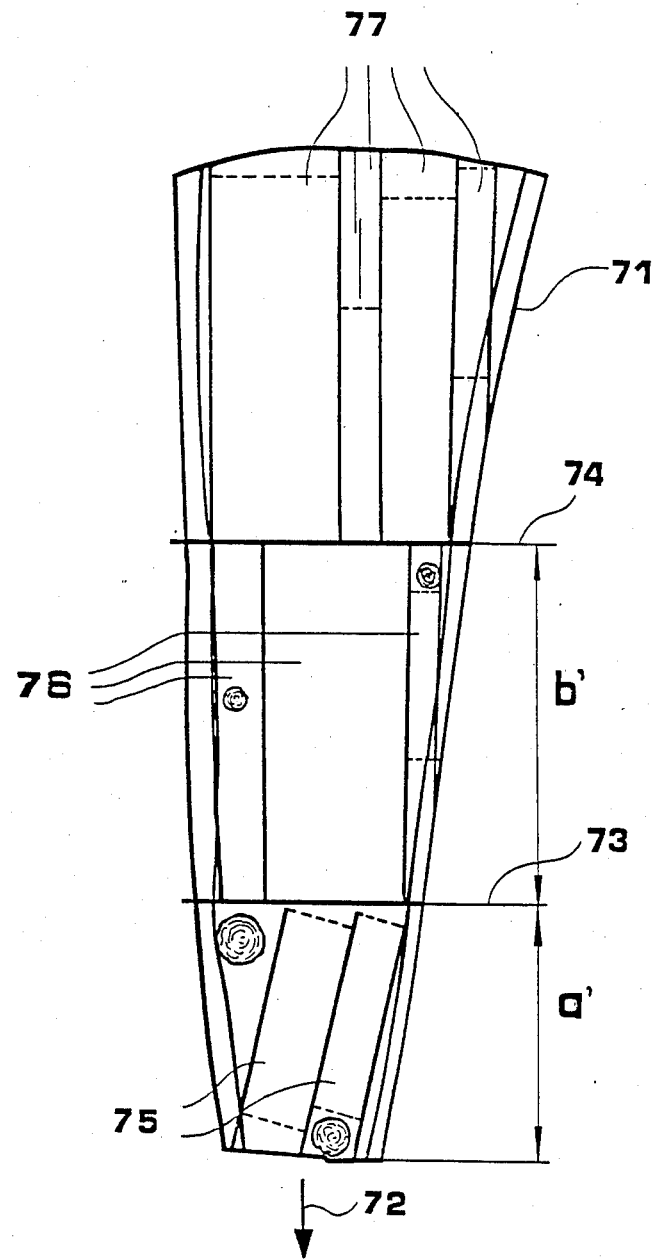
FIG. 8 illustrates how the product components are positioned in a wood slice sawed off a trunk.

FIG. 8 is an illustrative example of a sawing plan chosen for a certain slice of wood. The slice 71 is transported into the direction 72 and it is cut into three sections in the lines 73 and 74 the first having the length a', the second b' and the third the remaining length. FIG. 8 also illustrates how the product components are placed in the slice. The first section is cut into two components 75, the second into three components 76 and the third into four components 77. The dotted lines illustrate the final cutting lines for the components as determined by the computer.

Figure 9:
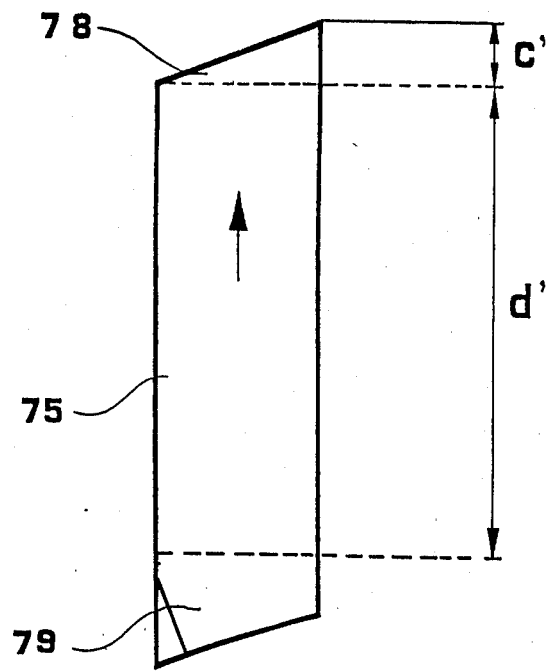
FIG. 9 illustrates how a single sawed-off component is trimmed and finished into a ready-made product component.

FIG. 9 is an illustrative example of a trimming operation where the item to be trimmed is one of the components 75 of FIG. 8. The first trimming length is c', and the sawn-off piece 78 is fed into chipping. The second trimming length is d', which is the final length for the component 75. Now the component 75 is conveyed, according to FIG. 5, through the intermediate storage 67 onto the sorting line 68 and is sorted, according to its quality and dimensions, into the compartment 69 reserved for it. The reject piece 79 of FIG. 9 is fed into chipping.

By aid of the wood slice treatment method according to the invention, the biological ingredients of wood can be best utilized by processing the tree trunk, through sawing into slices, directly into ready-made product components and not into ordinary sawn goods as is the current practice. Thus the conical shape of the trunk can be fully exploited and it can be ensured that the product components, which are generally short—between 100 cm and 200 cm or even shorter—are of the right practical quality: not too good, not too bad.

An essential feature of the wood slice treatment method of the present invention is that such factors which affect the quality of the wood, for example knots, cracks, bark pockets, blue-stain, heart rot etc. are observed and measured, and that their suitability or otherwise in the raw material for various product components is determined or found out, and that the slice sawed off the trunk is sawed into product components on the basis of this information and on the basis of the dimension and quality requirements of the components included in the production programme. In order to make recognition easier, the defects can be marked manually with different symbols. As the recognition techniques are improved, this can be carried out completely automatically, as is already the practice in some grading processes of sawn goods.

The above specification presents two methods for optimizing the use of wood material, i.e. trunks and wood slices sawed off trunks. Both methods can be applied independently. The wood slice treating method can also be employed in connection with the tree trunk sawing method.

The tree trunk sawing method has certain advantages as compared to the wood slice treating method. Industrial processors often have special demands concerning the thicknesses of the annual rings of the wood material and the section of the tree trunk where the raw material must be sawn off. In other words, some products are made of heartwood, some of sapwood. Nowadays many industrial processors buy heavy timber which they then cut and saw into suitable product components—only to make sure that the wood raw material comes from the heart of a big log. By employing the above described method for sawing a tree trunk, the ideal sawing point for a product component can be defined both in the lengthwise and crosswise directions if so desired. The customer can, while making the order, require that the component should be sawed for instance off the surface part of the middle section of the log, or off the heart of the butt-end log. This is not possible while using the current sawing methods.

The advantageous and practical nature of the three trunk sawing method of the present invention can also be illustrated by means of another example, where the desired product component is a square in cross-section (or a rectangular which is nearly a square), and only one side of the component will be the so-called "frontal" side. Now the required degree of quality is sufficed by a product component where at least one of the four sides is good enough. Furniture industry, for instance, has many uses for this type of products. This requirement can be taken into account in the sawing method of the present invention so that an extremely defective area, which is for instance covered by dry, small knots, is sawed into slices with a thickness corresponding to the desired square-shaped product components. Because one clean side is enough, the other saw-cut for making the product component is placed so that it runs along with the optimization process past the knots. Naturally it is remarkably easier to fit a line with a thickness of 4 mm (=the saw-cut) in between the knots than for instance the flat side of the product component, which may have the thickness of 50 mm. Thus even wood material with a weak quality can be sawed into products which look knot-free.

While specific embodiments of the invention have been shown and described to illustrate the application of the principles of the invention, it will be understood that the invention may be embodied otherwise without departing from such principles.

I claim:

1. A method information on for sawing a tree trunk, in which method the trunk dimensions and shape as well as the biological quality of each section of the trunk both in the lengthwise and crosswise direction are used along with the sawing process, and the said information is taken into account while treating the trunk the improvement, comprising the steps of;
   (a) recording a production programme comprising product components of various dimensions and qualities desired before the actual sawing process;
   (b) sawing the trunk into the two halves in the middle;
   (c) defining and recording the lengthwise quality borders (13, 14) of each trunk half (1, 2) on the basis of observing the sawed face (18);
   (d) measuring and recording the shape and size of each trunk half (1, 2);
   (e) combining the measuring results from item d) with the quality information from item (c);
   (f) optimizing the cross-cutting points and the sawing patterns on the basis of the measuring results and the quality information so that each trunk half is divided, in the lengthwise direction, into sections (3, 4; 7, 8; 9, 10), each section in principle belonging to one quality grade, and that into each section there are fitted such product components from the production programme which belong to the respective quality grade (FIG. 2), and the value yield is maximized;
   (g) subsequently sawing the trunk halves and cutting into suitable product components and sorting the components out.

2. The method according to claim 1 wherein: prior to the step of observing quality attributes a thin slice of the center part of the trunk, corresponding to the thickness of the heart of the trunk, is sawed off.

3. A method for treating a wood slice with a uniform thickness sawed off a tree trunk, in which method information on the shape of the said slice and the quality defects contained therein is known, whereafter the slice is cross-cut and sawed so that the said information is taken into account, the improvement, comprising the steps of:
   (a) recording a production programme comprising product components of various dimensions and qualities, desired before the actual sawing process;
   (b) defining and recording the lengthwise quality borders of the wood slice;
   (c) measuring the thickness and shape of the wood slice are measured and recording readings are recorded;
   (d) combining the measuring results from its (c) with the quality information defined in item (b);
   (e) optimizing the cross-cutting lines and the sawing patterns on the basis of the measuring results and the quality information so that in the wood slice there are fitted such product components which are included in the production programme, and from among the possible combinations of product components there is chosen to be realized, i.e. to be sawed, a combination where the value yield from the wood slice is maximized, whereafter
   (f) cross cutting the wood slice and sawing the wood slice into desired product components, which components are sorted out.

4. The method of claim 3, wherein the wood slice is treated according to item (f) above either as a whole, or cut into two or more sections, whereafter the wood slice or its separate sections are sawed into articles with the width of the product components and trimmed, if necessary, into the desirecd lenght.

5. The method of claim 3 or 4, wherein the cross-cutting, sawing into components and finishing into product components of the wood slice, as well as the sorting of the ready-made producct components, is arranged to be carried out automatically on the basis of one measurement, according to a predetermined production programme and the given sorting instructions.

6. The method of claim 3, 4 or 5, wherein the quality defects contained in the wood slice are marked manually with symbols which ascertain that the quality defects are observed on the measuring device.

7. A method of sawing a tree trunk, the tree trunk having a lengthwise and a cross-wise direction and having a region of varying biological quality grade, the method comprising the steps of:

(a) compiling data about desired product components having particular dimensions and qualities;

(b) recording said data of product components;

(c) sawing the tree trunk length-wise, preferably in halves, in the middle;

(d) observing quality attributes of regions of the trunk half face;

(e) defining length-wise quality borders at locations of each trunk half, on the basis of observed quality regions of the face of each tree trunk;

(f) recording data representing the locations of the defined lengthwise quality borders;

(g) measuring the shape and size of each trunk half;

(h) recording data representing the shape and size of each trunk half measured;

(i) combining the data of representing the size and shape of each trunk with the data representing the location of the quality borders;

(j) computing a value yield of product components from said data of product components and said combined data representing the shape and size of each trunk and the location of the quality borders;

(k) fitting into each quality grade region such product components as represent the value yield of product components and dividing each trunk half, in the length-wise direction, into sections, each section belonging to a quality grade region;

(l) optimizing cross-cutting points and sawing patterns based on the product component fit and the division of the trunk halves;

(m) subsequently, sawing the trunk halves and cutting same into product component;

(n) sorting the product components.

8. The method according to claim 7 wherein the steps of observing, defining, a recording data representing quality borders, measuring, recording data representing shape and size, combining, computing, fitting and dividing, and optimizing are performed one slice at a time and are repeated after each slice.

9. A method according to claim 7, 8 or 2 wherein each of the sawed faces of the sawed trunk halves are simultaneously utilized as data so as to support each other's grading.

10. A method for treating a wood slice of a uniform thickness sawed off a tree trunk, the wood slice have a lengthwise and a cross-wise direction and having a region of varying biological quality grade, the method comprising the steps of:

(a) compiling data of product components having particular dimensions and qualities;

(b) recording the data about desired product components;

(c) observing quality attributes of regions of the wood slice;

(d) defining length-wise quality borders at locations of each wood slice, on the basis of the observed quality regions of the wood slice;

(e) recording data representing the locations of the defined quality borders;

(f) measuring the shape and size of each wood slice;

(g) recording data representing the shape and size of each wood slice measured;

(h) combining the data representing the shape and size of each wood slice with the data representing the location of the quality borders;

(i) computing the maximized value yield of the product components from said data of product components and said combined data representing shape and size of the wood slice and the location of the quality borders;

(j) fitting into each wood slice such product components as represent the maximized value yield;

(k) optimizing cross-cutting lines and sawing patterns on the basis of the product component's fit;

(l) cross-cutting and sawing the wood slice into the desired product components;

(m) and sorting the product components.

* * * * *